(12) United States Patent
Harrington et al.

(10) Patent No.: US 6,775,820 B2
(45) Date of Patent: Aug. 10, 2004

(54) WEB BASED APPLICATION RE-CODED FOR OS/2 COMPATIBILITY

(75) Inventors: Gregory Lee Harrington, Pflugerville, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/725,997

(22) Filed: Nov. 29, 2000

(65) Prior Publication Data

US 2002/0092007 A1 Jul. 11, 2002

(51) Int. Cl.[7] .............................. G06F 9/44; G06F 9/45
(52) U.S. Cl. ...................... 717/110; 717/111; 717/113; 717/118; 717/148
(58) Field of Search ..................... 717/110, 111, 717/113, 118, 148

(56) References Cited

U.S. PATENT DOCUMENTS

| | | | |
|---|---|---|---|
| 5,761,673 A | | 6/1998 | Bookman et al. ........... 707/104 |
| 5,787,234 A | | 7/1998 | Molloy ........................ 395/51 |
| 5,916,310 A | * | 6/1999 | McCain ....................... 710/67 |
| 5,923,885 A | * | 7/1999 | Johnson et al. ............. 717/176 |
| 5,956,709 A | | 9/1999 | Xue ............................. 707/3 |
| 5,991,534 A | * | 11/1999 | Hamilton et al. ........... 717/111 |
| 6,011,916 A | * | 1/2000 | Moore et al. ............... 717/118 |
| 6,012,098 A | * | 1/2000 | Bayeh et al. ............... 709/246 |
| 6,035,119 A | * | 3/2000 | Massena et al. ............ 717/115 |
| 6,151,703 A | * | 11/2000 | Crelier ....................... 717/136 |
| 6,167,441 A | * | 12/2000 | Himmel ...................... 709/217 |
| 6,237,135 B1 | * | 5/2001 | Timbol ....................... 717/107 |
| 6,282,702 B1 | * | 8/2001 | Ungar ........................ 717/148 |
| 6,336,137 B1 | * | 1/2002 | Lee et al. ................... 709/219 |
| 6,489,954 B1 | * | 12/2002 | Powlette ..................... 345/733 |
| 6,564,375 B1 | * | 5/2003 | Jiang .......................... 717/165 |

* cited by examiner

Primary Examiner—Todd Ingberg
Assistant Examiner—Qamrun Nahar
(74) Attorney, Agent, or Firm—David A. Mims, Jr.; Rudolf O. Siegesmund

(57) ABSTRACT

A Web based application, specifically, HelpNow!®, that is not compatible with browsers of the OS/2 operating system because the Web based application contains JavaScript 1.2 statements is re-coded so that the Web pages of the Web based application will be compatible with the browsers of the OS/2 operating system.

15 Claims, 5 Drawing Sheets

WEB BASED APPLICATION RE-CODED FOR OS/2 COMPATIBILITY

FIELD OF THE INVENTION

The present invention relates to re-coding a Web based application, specifically IBM's HELPNOW!, containing JavaScript 1.2 statements, so that the Web based application will be compatible with the browsers of the OS/2 operating system.

BACKGROUND OF THE INVENTION

Through the Internet, a client computer can access applications from a server computer. However, a problem arises if an application, which the user of the client computer desires to access, cannot function with the client computer because it contains components that are incompatible with the client computer's operating system. INTERNATIONAL BUSINESS MACHINE's Web based application HELPNOW! uses JAVASCRTPT 1.2 statements that are interpreted by the end user's client side browser. A client computer using HELPNOW! may have a WINDOWS operating system that employs different versions of NETSCAPE and INTERNET EXPLORER browsers because the browser versions of these WINDOWS environments are able to run JAVASCRIPT 1.2. However, JAVASCRIPT 1.2 is not supported on OS/2 operating system browsers. Therefore. OS/2 users are precluded from accessing HELPNOW! because their browsers cannot interpret JAVASCRIPT 1.2. WINDOWS users with older browsers such as NETSCAPE 3 and INTERNET EXPLQRER 3 are also precluded from accessing HELPNOW! because their browsers can only interpret JAVASCRIPT 1.1 and 1.0 respectively. HELPNOW is not compatible with browsers of an OS/2 platform; therefore, HELPNOW! cannot be extended to client computers with browsers of an OS/2 platform. Potential HELPNOW! end users include those without browsers that support JAVASCRIPT 1.2, such as users with an OS/2 operating system and thus such end users are excluded from use of the Web based application HELPNOW! due to incompatible components of JAVASCRIPT 1.2.

As used herein, the term Incompatible Component (IC) shall mean JAVASCRIPT 1.2. As used herein, the term incompatible operating system shall refer to OS/2. As used herein, the term OS/2 refers to IBM Operating System 2. Also, as used herein the term Web based application shall refer to HELPNOW! and any other web based application which is not compatible with web browsers of the OS/2 operating system due to ICs.

A further problem arises involving ICs where Web based applications that are initially compatible, become incompatible due to vendor changes to the Web browser. For example, HELPNOW! is compatible with only some versions of NETSCAPE 4 while other versions in level 4 NETSCAPE will not correctly interpret all of the JAVASCRIPT 1.2 statements.

Therefore, a need arises for a way to make a Web based application containing ICs compatible with an incompatible operating system.

SUMMARY OF THE INVENTION

The invention which meets the need identified above is a re-coded HELPNOW!. The Web based application, HELPNOW!, that is not compatible with browsers of the OS/2 operating system because it contains JAVASCRIPT 1.2 statements, is re-coded so that the Web pages of the Web based application will be compatible with the browsers of the OS/2 operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
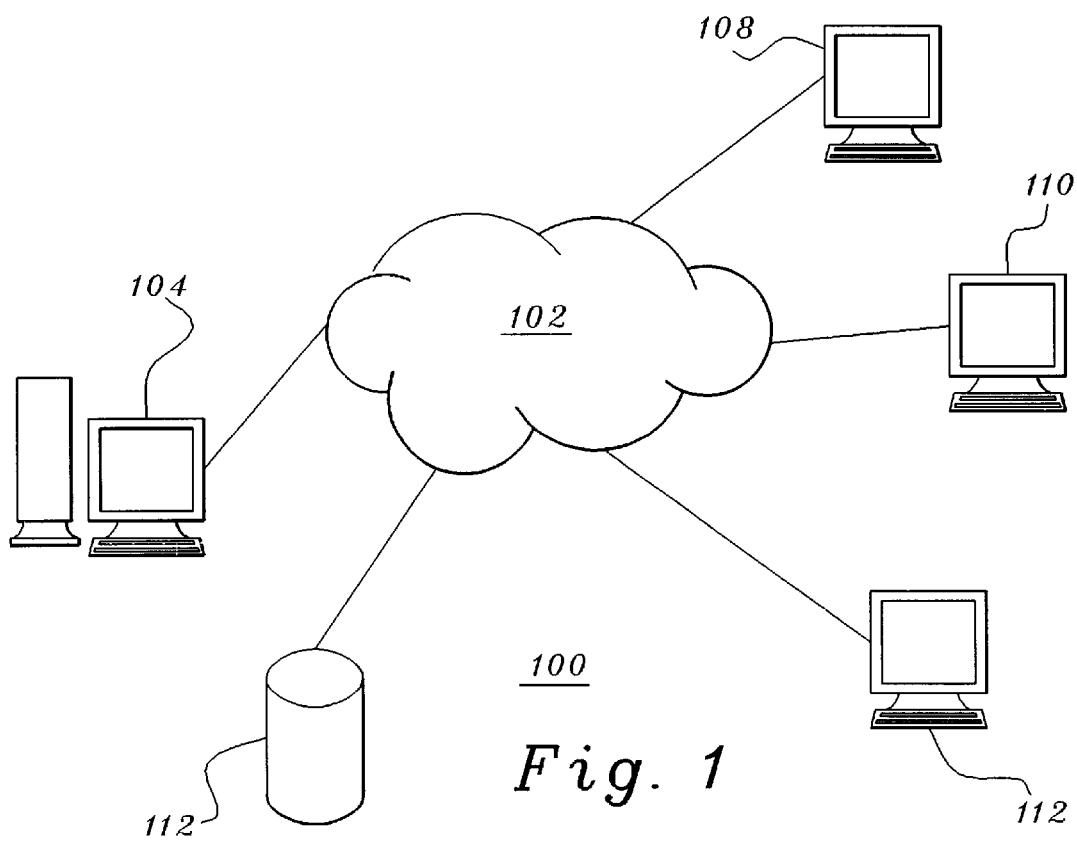
FIG. 1 depicts a distributed data processing system.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network, in the depicted example, server 104 provides Web based applications such as HELPNOW! to clients 108, 110 and 112. Clients 108, 110, and 112 are clients to server 104. Distributed data processing system 100 may include additional servers, clients, and other devices not shown. In the depicted example, distributed data processing system 100 is the Interact with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN).

Figure 2:
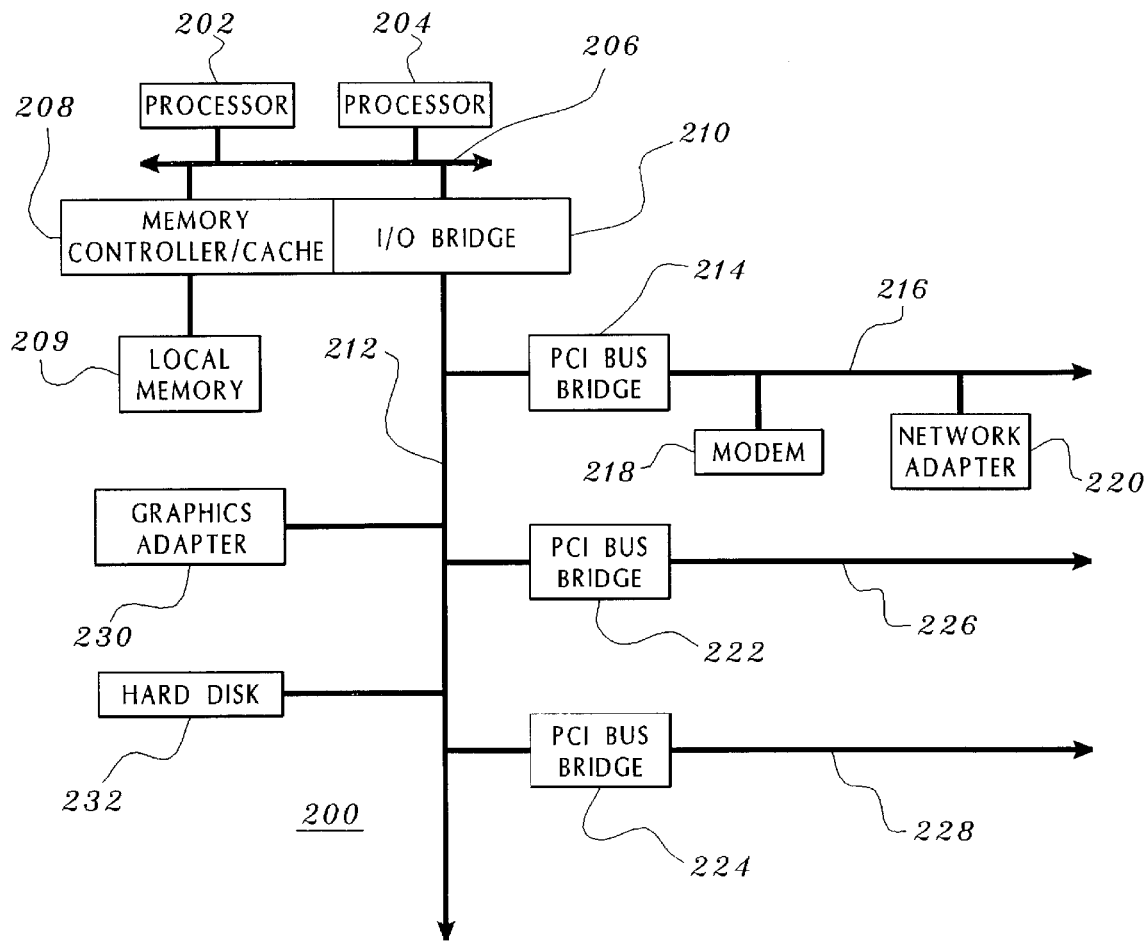
FIG. 2 depicts a block diagram of a server.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/0 bus 212. Memory controller/cache 208 and I/O bus bridge 210 may be integrated as depicted Peripheral component interconnect (PCI) bus bridge 214 connected to I/O bus 212 provides an interface to PCI local bus 216. Modem 218 may be connected to PCT bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
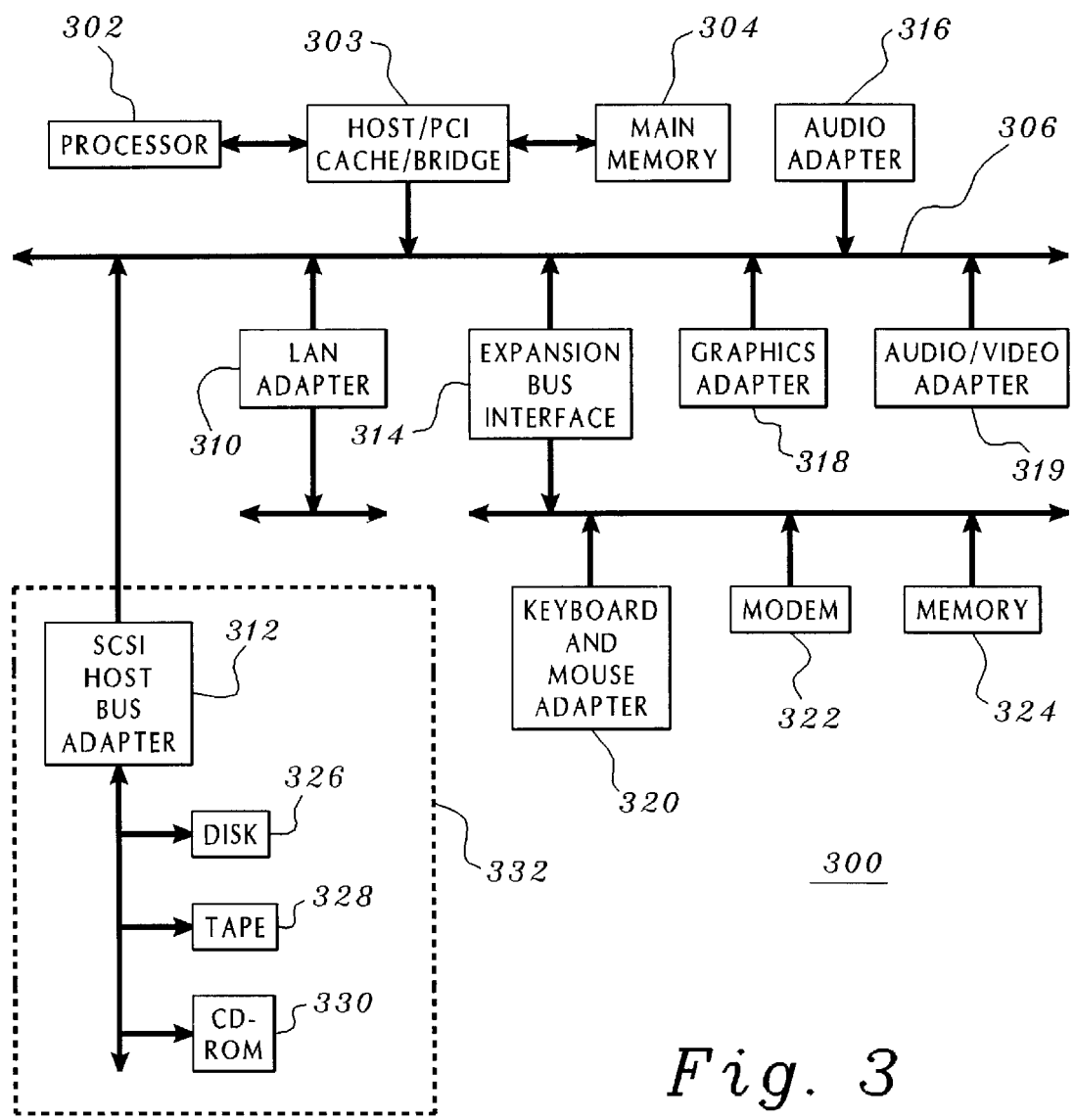
FIG. 3 depicts a block diagram of a client computer.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. OS/2 is a trademark of International Business Machines Corporation. An object oriented programming system, such as JAVA, may run in conjunction with the operating system and provides calls to the operating system from JAVA programs or applications executing on data processing system 300. JAVA is a trademark of Sun Microsystems, Inc. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
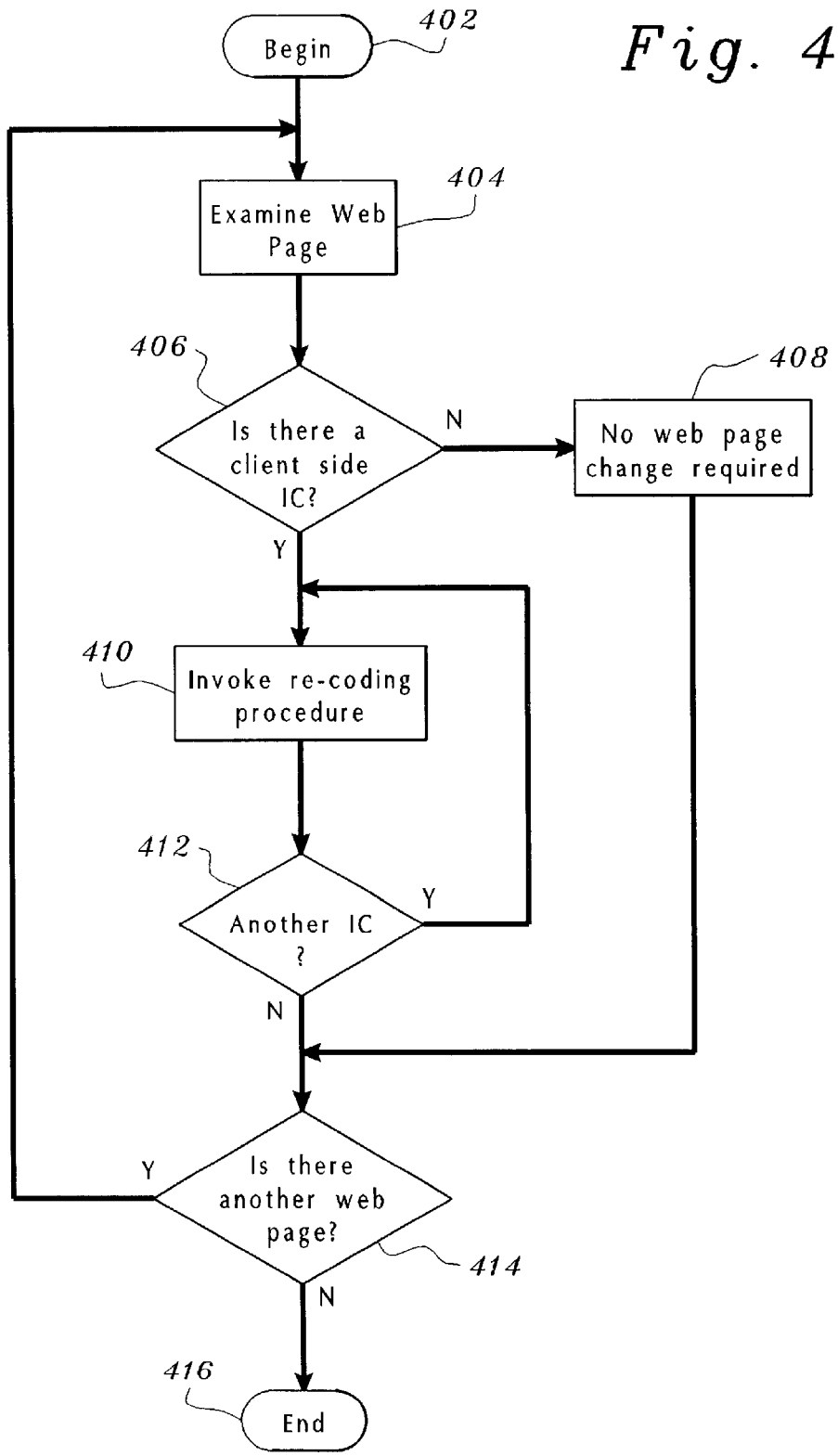
FIG. 4 depicts a flow chart of the application analysis.

FIG. 4 depicts analysis method 400. The method begins (402) when invoked by the user, and a Web page from the Web based application is examined (404). Next, the method will determine whether there is an IC in the Web page (406). If there is not an IC in the Web page, then no Web page changes are required (408) and the method will end (414). If there is an IC in the application, then the method will invoke the re-coding method (410). (The re-coding method is explained as re-coding method 500 below.) The method will then determine whether or not there is another IC in the application (412). If there is another IC in the application, then the method will go to step 410 and again invoke the re-coding procedure. If there is not another IC in the application, then the method determines whether there is another Web page to be examined (414). If there is another Web page to be examined, the method will go to step 404 and continue to cycle. If there is not another Web page to be examined, the method will end (414).

Analysis method 400 may be applied to HELPNOW! Web pages that need to be modified to work with most browsers, including browsers on OS/2 due to the presence of JAVA-SCRIPT 1.2. The HELPNOW! Web page is examined to determine whether or nor it has been previously examined for ICs. The examination of the HELPNOW! Web page can be initiated by either (1) opening the Web page using a normal text editor such as MICROSOFT Notepad, or (2) by opening the Web page within the application development environment of HELPNOW!, which is MICROSOFT Visual InterDev 6.0. Next, the Web page is analyzed to determine if there is an IC (406). The purpose of analysis of the Web page is to determine whether or not the Web page contains any JAVASCRIPT 1.2. One way to accomplish the determination is to search for all documents within the HELP-NOW! directories that contain the word, "JavaScript." Searching for all documents containing the word, "JavaScript," can be accomplished with the MICROSOFT WINDOWS 2000 operating system through MICROSOFT WINDOWS Explorer by right clicking on the x:\inetpub\wwwroot directory and selecting "Search . . . " (where x:\ is the drive letter where the MICROSOFT Internet Information Server default Web directory was installed). In the "Containing text:" text box of the search window, "JavaScript" (without the quotation marks) is entered. The resulting list contains every document that may need to be modified. Note that some documents could potentially contain the word "JavaScript" as part of some text and not as actual JAVASCRIPT 1.2 code. Such a page would not need to be modified. Analysis of the Web page may also be performed through the MICROSOFT WINDOWS NT 4.0 operating system with several additional steps to perform the text search.

In the case of HELPNOW!, the first JAVASCRIPT 1.2 component would be identified and the method would proceed to step 410 to invoke the re-coding procedure. After the first JAVASCRIPT 1.2 component was re-coded, the method would determine whether there was another JAVASCRIPT 1.2 component and, if so, the method would again invoke the re-coding procedure for that component (410). When the last HELPNOW! Web page has been examined, and when re-coding method 500 has been invoked for the last JAVASCRIPT 1.2 component, the method would end (416).

Figure 5:
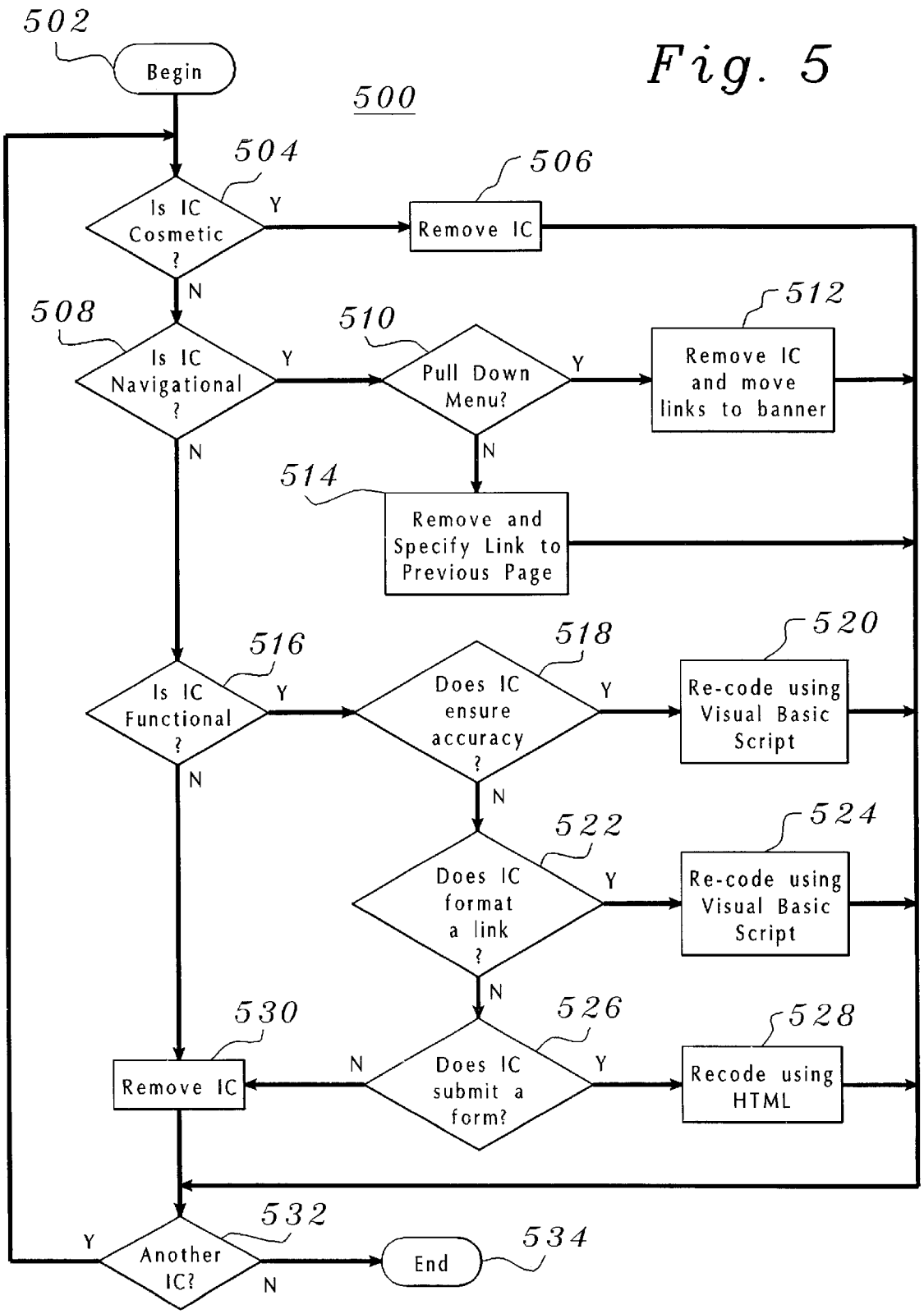
FIG. 5 depicts a flow chart of the re-coding procedure.

FIG. 5 depicts a flow chart for re-coding method 500, which may be invoked in step 410 of FIG. 4. The first step in the re-coding method is to examine an identified IC and to determine whether or not the IC is cosmetic (504). By "cosmetic" is meant that the purpose of the IC is to enhance the end user's interface. If the IC is cosmetic, it is removed (506) and the method will go to step 532 to determine whether there is another IC to be re-coded. In the preferred embodiment, the determination is whether or not a JAVASCRIPT 1.2 component is cosmetic. The most common cosmetic technique of HELPNOW! is to swap images when the end user hovers their cursor over an image. As used herein, swap means to move segments of programs or data between memory and disk storage. In HELPNOW!, the visual effect of a swap is most pronounced on the Home page that contains graphical buttons that correspond with sections of HELPNOW!. The primary color of the graphic is a relatively light shade of blue until the end user hovers their cursor over the graphic, at which time the graphic is swapped with one that bears the same resemblance in a relatively dark shade of blue. If a page has such a cosmetic use of JAVASCRIPT 1.2, the JAVASCRIPT 1.2 may be removed with no re-coding. A removal may reduce the visual appeal of a Web page; however, since there is no functional reason to have such a cosmetic feature on Web page, the functionality of HELPNOW! is not affected by removing the JAVASCRIPT 1.2 cosmetic component.

If a determination was made at step 504 that the IC was not cosmetic, the next step in re-coding method 500 is to determine whether the IC is navigational (508). By "navigational" is meant that the IC helps the end user navigate the Web application. If the IC is determined to be navigational, then a determination is made as to whether the IC involves a pull down menu (510). If the IC involves a pull down menu, then the IC is removed and the links are moved to the banner (512). Following step 512, the method proceeds to step 532 to determine whether there is another IC to be examined. If the IC does not involve a pull down menu, then the IC is removed and a link to the previous page is specified (514). Following step 514, the method proceeds to step 532 to determine whether there is another IC to be examined.

Applying re-coding method 500 to the HELPNOW! application, the navigation IC is either (1) the HELPNOW! pull down menu system or (2) a back button that sends the end user back to the previous page. In the case of a pull down menu system, the menu should be re-coded to conform to standard Web page navigation. Links that take an end user to different sections of a site usually appear on the banner or on the left side of the page, and sometimes on the right side or bottom of the Web page. Since HELPNOW! already has links in the banner, removing the JAVASCRIPT 1.2 pull down, and placing the links in the banner will eliminate the JAVASCRIPT 1.2 so that the page reformatting does not need to be redesigned. In the case of back buttons, the back buttons should either be removed to maintain consistency (there are many pages that do not have back buttons) or re-coded with standard HTML links to the preceding page.

The next step in the re-coding method is to determine whether the IC is functional (516). By "functional" is meant that the IC fulfills a necessary business or technical purpose in the Web site. If the determination is made that the IC is functional, then a determination is made as to whether the IC has the function of ensuring accuracy (518). If a determination is made that the function of the IC is to ensure accuracy, then the IC is re-coded with VISUAL BASIC Script (520). If the function of the IC is not to ensure accuracy, then a determination is made whether the IC formats a link (524). If the IC formats a link, then the IC is re-coded with VISUAL BASIC Script (526). If the IC does not format a link, then a determination is made whether the IC submits a form (528). If the IC submits a form, then the IC is re-coded using HTML (528). If the IC does not submit a form, then the method will go to step 530 and the IC will be removed.

If at step 516, a determination is made that the IC is not functional, the IC is removed (530) and the method will go to step 532 to determine whether there is another IC to be re-coded. If there is another IC to be re-coded, the next step in the method will be to go to step 504 and continue to cycle through the process. If there is not another IC to be re-coded, re-coding method 500 will end (534) until it is again invoked.

In the preferred embodiment, where re-coding method 500 is applied to HELPNOW!, functional JAVASCRIPT 1.2 includes JAVASCRIPT 1.2 items that (1) ensure required fields are complete and accurate, (2) format links, (3) submit a form, and (4) redirect to a timeout page. In the case of JAVASCRIPT 1.2 that ensures required fields are complete and accurate (518), the code is re-coded using server-side VISUAL BASIC Script with self-format submittal so that the Web page's form submits to itself with VISUAL BASIC Script "if" statements (520). For example, if the end user leaves a required field blank, the "if" statement will return the page with the field in red highlights, or some other attention-getting convention. Until all required fields are entered by the end user, the page will continually submit to itself. Once the end user completes all required fields, the "else" of the "if" statement will submit the form to the next page. Additionally, for JAVASCRIPT 1.2 code that ensures the data is accurate, VISUAL BASIC Script "if" statements are also used. HELPNOW! only validates items such as no trailing spaces or adding text to values. Therefore, VISUAL BASIC Script that converts to the valid entry is all that is required, and highlighting for the end user is unnecessary. To prevent the end user from having to re-enter text, the elements in the form are submitted in the URL so that the VISUAL BASIC Script code can parse the values and pre-populate fields that are valid.

In the case of JAVASCRIPT 1.2 that formats links (524), the code can be re-coded using server-side VISUAL BASIC Script and time zone preference (526). For example, rather than use client-side JAVASCRIPT 1.2 to determine if the application includes the knowledge base component, this function can be accomplished with server-side VISUAL BASIC Script. For another example, rather than use JAVASCRIPT 1.2 to format the time of the end user for displaying problem ticket status, the time zone offset can be calculated by asking the end user for their preferred time zone, which would be saved in their cookie. As used herein, the term cookie means a block of data that a Web Server stores on a client system so that when a user returns to the same Web Site, the browser sends a copy of the cookie back to the server.

In the case of JAVASCRIPT 1.2 that is determined to submit a form (526), the JAVASCRIPT 1.2 component is re-coded using HTML (528). In the case of a JAVASCRIPT 1.2 component that does not redirect on timeout, then recoding is performed using HTML. If the JAVASCRIPT 1.2 component does redirect on timeout, then the JAVASCRIPT 1.2 is re-coded using HTML to redirect on timeout. In the case of JAVASCRIPT 1.2 that redirects to a timeout page, the function can be re-coded using standard HTML, such as: <meta http-equiv="Refresh"content="1;URL=x.cgi">, where x.cgi is the target page and "1"is the allotted time. To preserve the parameterization of the timeout, the "1" can be substituted with a server-side VISUAL BASIC Script that compiles the page to include the value of the parameter.

If a JAVASCRIPT 1.2 component does not fall into any of the three categories of cosmetic, navigational or functional, it is removed at step 532. JAVASCRIVT 1.2 which does not fall into any of these three categories does nothing in HELPNOW!. For example, there are numerous pages that have no JAVASCRIPT 1.2 except for the line that tells the Web browser that JAVASCRIPT 1.2 code is about to follow (e.g., <script language="javascript">). However, an analysis of the page reveals that there is no JAVASCRIPT 1.2 that follows, so that the line of JAVASCRIPT 1.2 was not necessary. The JAVASCRIPT 1.2 code that does nothing may be removed with no effect on HELPNOW!. There are also pages that have JAVASCRIPT 1.2 popup alerts that say, "This page is customized for your account." JAVASCRIPT 1.2 such as this is always removed during an install, and if present during the re-coding process may be removed with no effect on HELPNOW!.

Re-coding the ICs increases the efficiency of the Web based application to which the re-coding procedure is applied. For example, applying analysis and re-coding method 400 and re-coding method 500 to a HELPNOW! 4.3 Entry home page reduces the page size 27%, from 14,646 bytes to 10,760 bytes. The reduction in page size reduces the network bandwidth required between the HELPNOW! server and the end users, which results in faster download time and increased server performance. The reduction in page size also enables the Web browser in compile the page faster because it does not need to interpret JAVASCRIPT 1.2 and because it has less data to load. Furthermore, the stability of HELPNOW! is improved by re-coding because the number of defects due to browser differences in interpreting JAVASCRIPT 1.2 are eliminated. For example, MICROSOFT INTERNET EXPLORER browsers can recover from a JAVASCRIPT 1.2 function used before its declaration whereas NETSCAPE browsers cannot.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed:

1. A Web application, wherein said Web application has been modified by removing incompatible JAVASCRIPT 1.2 components that are cosmetic, by removing incompatible JAVASCRIPT 1.2 components that do nothing, by re-coding incompatible JAVASCRIPT 1.2 components that are navigational, and by re-coding incompatible JAVASCRIPT 1.2 components that are functional.

2. A method for re-coding a Web application having at least one Web page that contains at least one JAVASCRIPT 1.2 components that is incompatible with an OS/2 Web browser, comprising the steps of:

identifying at least one JAVASCRIPT 1.2 component in the Web page; and re-coding the JAVASCRIPT 1.2 component.

3. The method of claim 2 wherein the step of identifying at least one JAVASCRIPT 1.2 component in the Web page further comprises the step of opening the Web page using a text editor.

4. The method of claim 2 wherein the step of identifying at least one JAVASCRTPT 1.2 component in the Web page further comprises the step of opening the Web page using MICROSOFT Notepad.

5. The method of claim 2 wherein the step of identifying at least one JAVASCRIPT 1.2 component in the Web page further comprises the step of opening the Web page within the application development environment comprising MICROSOFT Visual InterDev 6.0.

6. The method of claim 2 wherein the step of identifying at least one JAVASCRIPT 1.2 component in the Web page further comprises the step of searching for all documents within the Web application directories that contain the word, "JavaScript".

7. The method of claim 2 wherein the step of re-coding the JAVASCRIPT 1.2 component further comprises the steps of:

determining whether the JAVASCRIPT 1.2 component is cosmetic; and responsive to a determination that the JAVASCRIPT 1.2 component is cosmetic, removing the JAVASCRIPT 1.2 component.

8. The method of claim 2 wherein the step of re-coding the JAVASCRIPT 1.2 component further comprises the steps of:

determining whether the JAVASCRIPT 1.2 component is navigational;

responsive to a determination that the JAVASCRIPT 1.2 component is navigational, determining whether the JAVASCRIPT 1.2 component involves a pull down menu;

responsive to a determination that the JAVASCRIPT 1.2 component involves a pull down menu, removing the JAVASCRIPT 1.2 component and moving a link to a banner; and responsive to a determination that the JAVASCRIPT 1.2 component does not involve a pull down menu, removing the JAVASCRIPT 1.2 component and specifying a link to an alternate Web page.

9. The method of claim 2 wherein the step of re-coding the JAVASCRIPT 1.2 component further comprises the steps of:

determining whether the JAVASCRIPT 1.2 component is navigational;

responsive to a determination that the JAVASCRIPT 1.2 component is navigational, determining whether the JAVASCRIPT 1.2 component involves a back button; and responsive to a determination that the JAVASCRIPT 1.2 component involves a back button that sends an end user back to a previous page, removing the back button.

10. The method of claim 2 wherein the step of re-coding the JAVASCRIPT 1.2 component further comprises the steps of:

determining whether the JAVASCRIPT 1.2 component is navigational;

responsive to a determination that the JAVASCRIPT 1.2 component is navigational, determining whether the JAVASCRIPT 1.2 component involves a back button;

responsive to a determination that the JAVASCRIPT 1.2 component involves a back button that sends an end user back to a previous page, re-coding with an HTML link to a preceding page.

11. The method of claim 2 where the step of re-coding the JAVASCRIPT 1.2 components further comprises the steps of:

determining whether the JAVASCRIPT 1.2 component is functional; and responsive to a determination that the JAVASCRIPT 1.2 component is functional, determining whether the JAVASCRIPT 1.2 component ensures accuracy.

12. The method of claim 2 where the step of re-coding the JAVASCRIPT 1.2 components further comprises the steps of:

determining whether the JAVASCRIPT 1.2 component is functional;

responsive to a determination that the JAVASCRIPT 1.2 component is functional, determining whether the JAVASCRIPT 1.2 component ensures accuracy;

responsive to a determination that the JAVASCRIPT 1.2 component ensures accuracy;

re-coding the JAVASCRIPT 1.2 component using a server-side VISUAL BASIC SCRIPT with a self-format submittal so that a form of the Web page submits to itself with a VISUAL BASIC SCRIPT "if" statement.

13. The method of claim 2 where the step of re-coding the JAVASCRIPT 1.2 components further comprises the steps of:

determining whether the JAVASCRIPT 1.2 component is functional; and responsive to a determination that the JAVASCRIPT 1.2 component is functional, determining whether the JAVASCRIPT 1.2 component formats a link.

14. The method of claim 2 where the step of re-coding the JAVASCRIPT 1.2 components further comprises the steps of:

determining whether the JAVASCRIPT 1.2 component is functional;

responsive to a determination that the JAVASCRIPT 1.2 component is functional, determining whether the JAVASCRIPT 1.2 component submits a form; and responsive to a determination that the JAVASCRIPT 1.2 component submits a form, re-coding the JAVASCRIPT 1.2 component using HTML.

15. The method of claim 2 where the step of re-coding the JAVASCRIPT 1.2 components further comprises the steps of:

determining whether the JAVASCRIPT 1.2 component is functional;

responsive to a determination that the JAVASCRIPT 1.2 component is functional, determining whether the JAVASCRIPT 1.2 component submits a form;

responsive to a determination that the JAVASCRIPT 1.2 component submits a form, determining whether the JAVASCRIPT 1.2 component redirects to a timeout page; and responsive to a determination that the JAVASCRIPT 1.2 component redirects to a timeout page, re-coding with standard HTML so that the Web page is replaced with the timeout page after an allotted time.

* * * * *

UNITED STATES PATENT AND TRADEMARK OFFICE
CERTIFICATE OF CORRECTION

PATENT NO.    : 6,775,820 B2
DATED         : September 10, 2004
INVENTOR(S)   : Harrington et al.

It is certified that error appears in the above-identified patent and that said Letters Patent is hereby corrected as shown below:

Column 1,
Line 21, "JAVASCRPT" should be -- JAVASCRIPT --
Line 28, "Therefore." should be -- Therefore, --
Line 56, "4 NETSCAPE" should be -- 4 of NETSCAPE --

Column 2,
Line 48, "Interact" should be -- Internet --
Line 42, "network" should be -- network. --
Line 42, "in" should be -- In --

Column 7,
Line 41, "JAVASCRIVT" should be -- JAVASCRIPT --
Line 65, "in" should be -- to --

Column 8,
Line 6, "whereas" should be -- whereas, --
Line 29, "components" should be -- component --

Column 10,
Line 2, "accuracy," should be -- accuracy, --

Signed and Sealed this

Twenty-sixth Day of October, 2004

JON W. DUDAS
*Director of the United States Patent and Trademark Office*